(12) United States Patent
Iversen

(10) Patent No.: US 8,613,602 B2
(45) Date of Patent: Dec. 24, 2013

(54) PRESSURE BOOSTER WITH DOUBLE-SEAT VALVE

(75) Inventor: Jesper Will Iversen, Sonderborg (DK)

(73) Assignee: Scanwill Fluidpower APS, Sonderborg (DK)

( * ) Notice: Subject to any disclaimer, the term of this patent is extended or adjusted under 35 U.S.C. 154(b) by 869 days.

(21) Appl. No.: 12/309,717

(22) PCT Filed: Aug. 20, 2007

(86) PCT No.: PCT/EP2007/007340
§ 371 (c)(1),
(2), (4) Date: Nov. 16, 2009

(87) PCT Pub. No.: WO2008/019889
PCT Pub. Date: Feb. 21, 2008

(65) Prior Publication Data
US 2010/0080718 A1  Apr. 1, 2010

(30) Foreign Application Priority Data
Aug. 18, 2006  (DE) .......................... 10 2006 038 862

(51) Int. Cl.
*F04B 17/00*  (2006.01)
*F04B 35/00*  (2006.01)

(52) U.S. Cl.
USPC ........................................................ 417/225

(58) Field of Classification Search
USPC .................... 417/225, 245, 403, 404; 91/300
See application file for complete search history.

(56) References Cited

U.S. PATENT DOCUMENTS

| | | | | |
|---|---|---|---|---|
| 4,601,642 A * | 7/1986 | Andrews | ....................... | 417/225 |
| 4,659,294 A * | 4/1987 | Barthomeuf | ................... | 417/397 |
| 5,170,691 A * | 12/1992 | Baatrup | .......................... | 91/287 |
| 5,609,477 A * | 3/1997 | Saurwein | ...................... | 417/567 |
| 6,409,482 B1 | 6/2002 | Fon | | |
| 6,776,080 B2 * | 8/2004 | Hansen et al. | .................. | 91/300 |
| 6,866,485 B2 * | 3/2005 | Hansen et al. | ................ | 417/225 |
| 7,354,252 B2 * | 4/2008 | Baatrup et al. | ................ | 417/245 |

FOREIGN PATENT DOCUMENTS

| | | |
|---|---|---|
| DE | 196 33 258 C1 | 8/1997 |
| DE | 197 14 100 C1 | 3/1998 |
| DE | 10002722 A1 | 10/2002 |
| DE | 10145822 B4 | 3/2003 |
| EP | 0 825 348 A | 2/1998 |

* cited by examiner

*Primary Examiner* — Devon Kramer
*Assistant Examiner* — Amene Bayou
(74) *Attorney, Agent, or Firm* — Setter Roche LLP

(57) ABSTRACT

The invention relates to a pressure boost for fluids, in particular hydraulic fluids, having a booster piston and a control piston unit, wherein a low-pressure side of the booster piston can be alternately connected by the control piston unit via a cylinder line to a low-pressure feed line and a discharge line, and a high-pressure side of the booster piston can be alternately connected to a high-pressure load line and a low-pressure feed line, wherein the control piston unit has two elements which are embodied as seat valves and which each interact with one valve seat and which are designed such that one of the elements intermittently seals off the low-pressure feed line, which can be connected to the low-pressure side of the booster piston, and the other element intermittently seals off the discharge line, which can be connected to the low-pressure side of the booster piston.

14 Claims, 7 Drawing Sheets

PRESSURE BOOSTER WITH DOUBLE-SEAT VALVE

FIELD OF THE INVENTION

The invention relates to a pressure intensifier for fluids, in particular for hydraulic fluids.

BACKGROUND OF THE INVENTION

Such a pressure intensifier is known from European patent EP 0 825 348 B1 and from the associated German priority patent DE 196 33 258. In the assembly known from these patents, the working chamber on the low-pressure side of the booster piston is charged and discharged by means of a control piston reciprocated between two positions, a charging position in which it feeds the low-pressure working chamber with low-pressure fluid, and a corresponding discharge position.

However, the known pressure intensifier employs a control piston designed as a one-piece valve actuator. The valve actuator has some special constructional features in order to meet the stated objective of this assembly. According to said patents, the tendency of the valve actuator to vibrate at high frequencies is to be reduced and resonance to be avoided, that is, even at high working frequencies, the valve actuator is supposed to be propelled beyond the mouth of the cylinder line leading towards the low-pressure working chamber of the booster piston as quickly as possible and without being affected by possible impacts, from its charging position in which it connects the cylinder line with the low-pressure feed line, into its discharging position, where it connects the cylinder line with the pressureless tank line. This is supposed to reduce the time the valve actuator requires for a complete and clean reversal from the charging position into the discharging position (and vice versa). The aim is that at high working frequencies, the pressure intensifier piston need not wait unnecessarily long for the valve actuator to have reversed cleanly, and that the entire flow cross section of the valve is then available for charging or discharging the low-pressure working chamber.

Of course, this is a matter of milliseconds for each working cycle that can be gained or lost. However, even small gains in time at each working cycle add considerably if the pressure intensifier is operated at a high working frequency in order to deliver as large an amount as possible of oil under high pressure; the pressure intensifier known from said patents, according to their statements, achieves a respectable delivered quantity at the high-pressure side, i.e. more than 2.5 l/min at a working frequency of more than 30 Hz and a maximum supplied quantity of more than 10 l/min.

In order to achieve such a performance, this known assembly concerns itself with the design of the valve actuator.

One of the two complementary measures that are supposed to increase the oscillation frequency of the valve actuator is that the control line pressure is applied to the valve actuator on its one side and a constant pressure on its other side, that is, the pressure from the low-pressure supply line which is available as the maximum operating pressure. Thus, a constantly maximal force acts on this side. In the reversal phase, this forces the valve actuator to accelerate maximally. The shot from the charging position into the discharging position thus requires as little time as possible. As another indispensable measure, said patents additionally provide a special embodiment of the valve actuator designed as a slide valve. Because the valve actuator is supposed to be configured such that the control disk, whose circumference seals against the cylinder bore, need only be shot from the one side of the mouth of the cylinder line to the other side of the mouth of the cylinder line in order now to connect the cylinder line, instead of with the low-pressure feed line, with the pressureless tank line and vice versa. This control disk forms the actual slide valve, which is unaffected by impacts even at high piston speeds, operates in a short-stroke manner, and has very little mass. The two measures supplement each other.

This design of the valve actuator as a slide gate valve, which as such is rather advantageous, however has certain serious drawbacks. Fundamentally, the manufacture of a slide gate valve is exceptionally expensive. Because the control disk, which in such a valve actuator seals the two sections of the annular space with respect to each other and the cylinder wall, must travel in the cylinder bore it is assigned to at the lowest tolerance. This means that not only must the control disk be ground, but the cylinder bore must be honed above all. Such a honing of the cylinder bore is exceptionally expensive.

Also, such an assembly is very susceptible to wear. Because travel of the control disk must be maintained at the lowest tolerance over the entire life of the pressure booster. This is critical especially if the valve actuator is to travel at extremely high frequencies, thus covering extreme sliding distances during the course of its life. At the high frequencies intended here, small dirt particles having an abrasive effect already suffice to generate scores and the like in the control disk and/or the cylinder bore, thus reducing the quality of the sealing effect of the slide gate valve or disabling its sealing function to the point of unserviceability.

In addition, repair of such a slide gate valve is very complex. The cylinder bore must be rehoned for the repairs (as a rule, the alternative, possible use of a new casing is uneconomical because in most cases, the slide gate valve is accommodated together with the booster piston in a joint casing). It thus becomes oversized, i.e. its diameter becomes larger. Therefore, no series-produced slide gate valve can be inserted into the rehoned cylinder bore anymore. Instead, a slide gate valve has to be inserted which is produced as a special spare part, with the slide gate valve being correspondingly oversized at its outer circumference. This requires elaborate storage and the costly manufacture of special components.

The pressure boosters of the type addressed herein, as a matter of principle, can be fed with different amounts of pressure, therefore supplying high pressures without any reconfigurations or adjustments being necessary. Since such pressure booster are very often used in a mobile manner, for example on construction sites, this is a great advantage; to a large extent, a pressure booster makes do with the available feeding pressure. With regard to the pressure booster proposed in the patents mentioned in the introduction, which is actually being built, it is known that it is suitable for being fed with pressures from about 35 to about 300 bar. Given a pressure boosting ratio of, for example, 4:1, about 140 to 1200 bar are thus available on the high-pressure side. A feed at higher pressures, such as 350 bar, 500 bar or more, poses problems in this pressure booster due to the leakage flows which then occur to a very considerable extent at the control disk, unless a very expensive control disk with an extremely exact fit is used in a special case, which could possibly push the limit up slightly. If only higher feeding pressures are available (e.g., during mobile use), they must be reduced prior to being fed into the pressure booster, which is uneconomical.

In view of this, it is the object of the invention to avoid these drawbacks.

SUMMARY OF THE INVENTION

The essential measure here is that the control piston unit has several elements formed as seat valves that each cooperate with one valve seat and which are designed such that one of the elements intermittently seals the low-pressure feed line P, which can be connected to the low-pressure side of the booster piston, with respect to the cylinder line and the outlet line, and the other element intermittently seals the outlet line, which can be connected to the low-pressure side of the booster piston, with respect to the cylinder line and the low-pressure feed line.

A seat valve within the sense of the invention is a valve, which, in the closed state, is pressed against a countersurface and thus seals it, in principle, without any leaks. In contrast, the so-called slide gate valves do not abut against the countersurface but form a (possibly very small) leakage-inhibiting, but not leakage-free, sealing gap with the countersurface.

Once seat valves designed according to the invention are being used, the cylinder bore need not be honed anymore but may be realized with considerably higher tolerances and surface roughnesses. Because the cylinder bore as such does not contribute to the sealing effect anymore, its sole task is now to guide the control piston unit. A simple transition fit and, at the same time, requirements that are not very high, are sufficient for this purpose.

The manufacture of a seat valve is very easy. In order to manufacture a seat valve, the control piston unit must primarily be subjected to constructional measures. It must be equipped with the appropriate valve cones. Under favorable circumstances, other processing steps on the casing can be omitted. Otherwise, it is sufficient to mill or grind the contact surfaces allocated on the casing to the valve cones in an appropriate manner in a cone shape or spherical shape. This does not cause any special effort.

A seat valve is also largely insusceptible with regard to contamination that has an abrasive effect. An abrasive particle which actually arrives in the valve seat is either crushed there and thus rendered harmless (grain of sand or dust), or it impedes the sealing effect of the valve, but does so only temporarily, until it is flushed out. Such abrasive particles do not cause any substantial damage to the valve seat. This means that not only is the pressure booster according to the invention decidedly cheaper, but it is also significantly more reliable in practical application.

Finally, a seat valve is superior to the hitherto used slide valve in that it always seals completely; irrespective of the amount of pressure difference to be sealed, no leak will occur. Because the higher the pressure acting on the valve, the stronger the seat valve is pressed onto its seat. A pressure-related enlargement of the cylinder bore and thus of the sealing gap, which causes problems for the slide valve at higher pressures, does not play a role. It is different when it comes to a slide valve. Here, the inevitable leakage flow increases together with the amount of pressure difference to be sealed.

Therefore, the pressure booster according to the invention is much more universally useable. On the side of the feed, it can cope with pressures from about 35 bar, with the maximum allowable pressure only being determined by the strength of the pressure booster; maximally, the feeding pressure may only become so high that no acute failure occurs, in particular on the high pressure side, nor material fatigue (if durability is desired), or premature fatigue (if the aim is only to achieve a temporary strength). In practical application, the pressure booster can readily be dimensioned such that it can also cope, on the feed side, with pressures of 500 to 750 bar, preferably also with higher pressures.

With the use of seat valves, the invention pursues a different path from the known assembly. It does not aim at making the control piston unit as such ever faster in order thus to improve the performance of the pressure booster. Instead, it leaves the path laid out by the known assemblies and primarily aims at making the control piston unit and its associated cylinder bore decisively cheaper, at first without any particular concern with regard to the maximum possible working frequency of the control valve, which tends to be limited by the elastic rebounding tendency of narrow valve seats.

The concept described herein nevertheless makes it possible to drive the performance of a pressure booster into a region of very ambitious areas in a roundabout way. Because where very high output capacities are demanded from the pressure intensifier, the concept makes it possible to incorporate several, preferably 2 to 4 synchronously operating valves at reasonable cost, similar to the principle of multi-valve technology in modern combustion engines. The low-pressure working chamber of the single pressure booster piston is then charged and discharged simultaneously via several valves, i.e., the flow cross section via which the charging and discharging takes place becomes significantly larger. Accordingly, the charging and discharging process is quicker. In that case, the point is not whether fractions of a second can be gained by a very fast and particularly precise reversal process at the start or the end of the charge and discharge cycle.

An advantageous embodiment of the invention provides that the two elements which are formed as seat valves and each cooperate with one valve seat are not connected with each other. The reciprocal interference of the two seat valves due to production tolerances that are too large can thus be avoided reliably, because one valve has already fully gone on its seat, whereas the other valve is not yet completely closed, thus inescapably remaining in an at least partially opened position.

Another alternative embodiment provides that the two elements are connected with each other. Contrary to what was stated above, this variant may also be advantageous in individual cases. Particularly so, if it becomes clear in individual cases that the inevitable relative movement of two non-connected elements leads to interference, so that the increased effort of connecting (e.g. by press-fit) the two elements during assembly while complying with strict tolerances, thus enforcing an absolutely synchronous movement of the two parts, is accepted.

According to another advantageous embodiment, it is provided that one of the elements is formed to be piston-shaped and, for acting on the other element, has a rod-like section or appendage, which has been manufactured with a smaller diameter and is fixed by positive fit on only one side, which is so long that it intermittently reaches over the mouths of two lines connected with the cylinder bore. Together with the cylinder bore, the piston-shaped section forms a sliding guide. A clean guidance in the cylinder bore is thus ensured, also of the rod-like section with its end, which is free on one side, i.e. non-guided. On the one hand, the rod-like section serves to act on the other element, and, on the other hand, constitutes the actual hydraulically effective element in a simple manner. Because the rod-like section contributes to connecting either the outlet line or the low-pressure feed line with the cylinder line. The diameter of the rod-like section is selected to be correspondingly small with respect to the larger diameter of the piston section holding it.

Another advantageous embodiment provides that the other of the two elements is also formed to be piston-shaped. A precise guide also of the second element can easily be ensured in this manner.

A particularly advantageous variant which is alternative to the above described embodiment provides that the other of the elements is spherical. This is a decisive advantage with regard to the production costs, because spheres having a hardened surface with a first-rate polishing are "off-the-shelf" components which can be bought for a few cents. It is particularly advantageous that spheres may optionally be used that were rejects from the production of ball-bearing manufacturers because they do not satisfy the extremely strict tolerance specifications for ball bearings, which, however, does not render them unusable for the present case of use.

Another exceptionally advantageous embodiment provides that the element, which intermittently seals the low-pressure feed line connectable with the low-pressure side of the booster piston with respect to the cylinder line and the outlet line, is located between the low-pressure line and the cylinder line when the low-pressure chamber is filled and is arranged in the cylinder associated with it in such a way that fluid can flow from the low-pressure feed line past said element into the cylinder line to the low-pressure chamber in order to fill the low-pressure chamber. Advantageously, this is the only hydraulic path via which the low-pressure working chamber of the booster piston can be filled with low-pressure fluid. This causes a substantial simplification because the low-pressure line used for driving the control piston unit is simultaneously used to fill the low-pressure working chamber. Thus, a low-pressure line can be omitted. It is obvious that this saves costs.

Besides the other element, an additional guiding element for the at least temporary control of guidance or position of this other element is advantageously provided. This prevents the other element from taking an undesirable position distant from the seat in the cylinder. A spring can be such a guiding element. The use of a spring is advantageous in that this is also a standard component which can be bought cheaply. Also, the use of a spring prevents the occurrence of rattling because the other element is always guided cleanly.

Optimally, however, the additional guiding element is designed as a seat element which centers the other element in the cylinder bore when it comes into contact with the seat element. The seat element is positioned and designed such that it always holds the other element close to its valve seat after lifting off from its valve seat. This ensures a quick and clean response as soon as the control piston unit reverses from the charging position into the discharging position.

Ideally, at least one of the seat valves is designed such that a hysteresis results during the cycle of movement of the control piston unit between its two extreme positions. This takes place because the surface on the control piston unit to which the drivingly acting pressure is applied becomes smaller once the control piston unit bears on the valve seat concerned, while the other side of the control piston unit is exposed to the pressure of the control line on an undiminished surface area. This causes a kind of self-holding effect. If the pressure in the control line was sufficient to press the control piston unit onto its seat for a moment, then the control piston unit does not even open (inadvertently) when the pressure in the control line drops slightly. An additional result, possibly in conjunction with other force-limiting or attenuating measures, for example, is a slowed-down movement of the control piston unit during reversal. As soon as the pressure in the control piston unit drops, the control piston unit is not shot into its other position immediately and "with all force", but first lifts off its seat and is then increasingly accelerated. It is thus possible to set a perfect timing, i.e. to begin the control process early or to ensure that it has an effect on the booster piston only when the booster piston has reached its desired dead center position (TDC/BDC); to be exact, when it comes to a free-piston engine, one cannot speak of dead centers, what is meant, therefore, are the points where the movement of the booster piston ideally reverses.

The stroke of the booster piston can thus be exploited in an optimal way. This does not necessarily increase the working frequency and thus, the output of the pressure booster. However, it does increase the energetic efficiency, thus leading to the hydraulic fluid and the pressure booster being heated up less when operating at high frequencies. This is indeed relevant. Because in practical application, the working frequency of a pressure booster cannot be increased arbitrarily, because of the heat transformation in the pressure booster or the hydraulic fluid (e.g., by increasing the charging pressure), since the heat increases as the working frequency rises, which finally leads to cavitation and thus, to damage.

Other advantages and possible embodiments become apparent from the following description of the Figures.

DETAILED DESCRIPTION OF THE PREFERRED EMBODIMENTS

Figure 1:
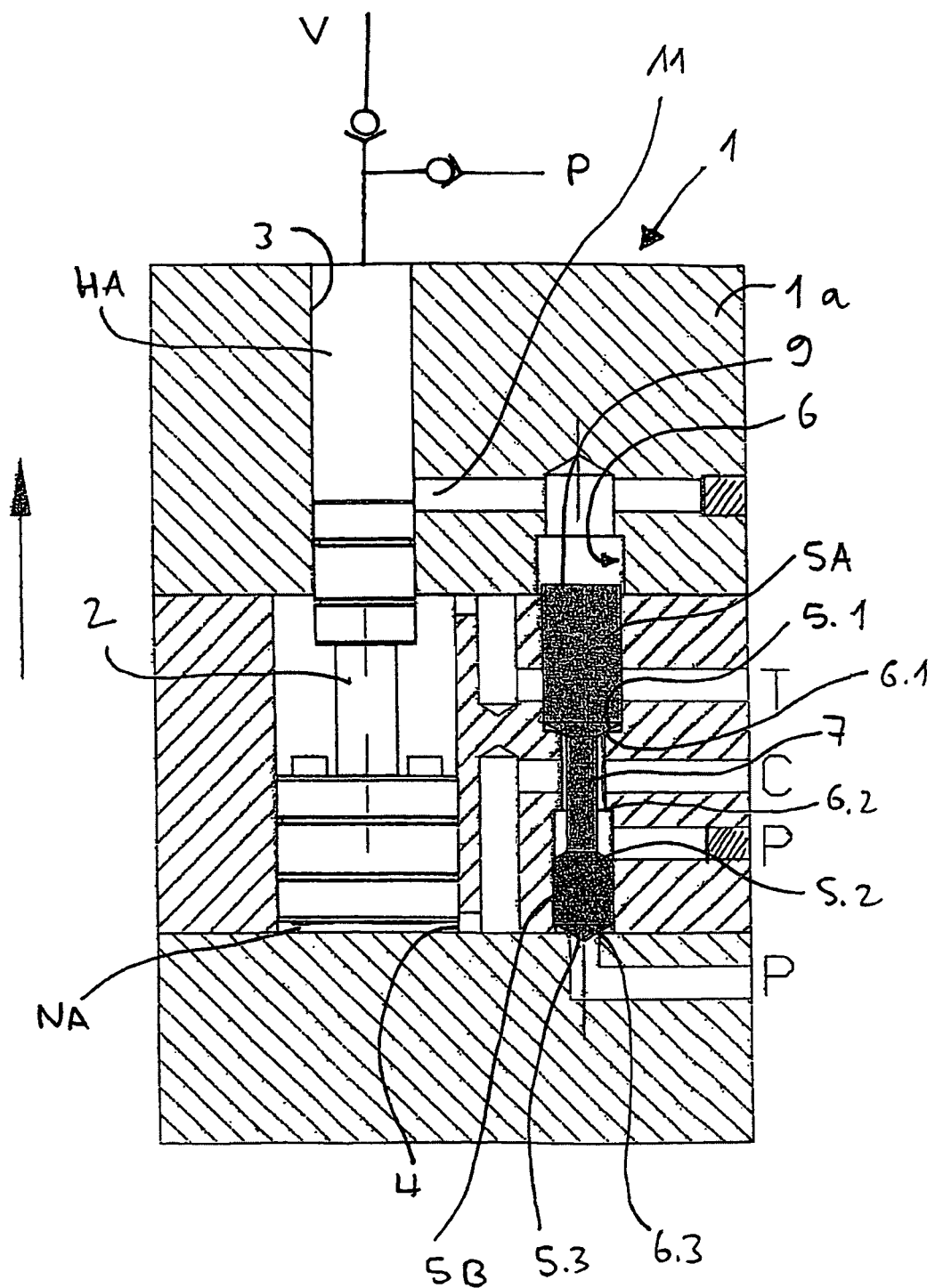
FIG. 1 shows a first exemplary embodiment of the pressure booster according to the invention at the start of a new working cycle for generating high pressure.

FIG. 1 shows an exemplary embodiment of the pressure booster according to the invention as it is preferably used for increasing pressure of hydraulic oil or water for supplying, for example, rescue cutters, clamping devices, high pressure fluid jet cutting tools and hydraulic blasting devices for concrete, rock and the like. The pressure booster is particularly suitable especially for the last purpose of use, because 2000 bar and more are often required on the high-pressure side, which can be realized most easily if a relatively high feeding pressure, which optionally is generated by a pressure booster (cascade system), can already be applied to the pressure booster arranged on the load side. Because where a higher boosting ratio must be realized on the side of the booster piston due to the limitation of the feeding pressure at the last stage, the discharged amount on the high-pressure side either becomes significantly smaller, or the pressure booster becomes significantly larger and heavier.

The pressure booster consists of a metal block 1a, which for reasons of production is made of several parts (in this case, three parts). The individual parts are screwed into each other, optionally using appropriate gaskets and stretching bolts.

Block 1a is provided with two cylinder bores 3 and 4 in which the booster piston 2 designed as differential piston reciprocates. At the same time, block 1a is provided with a cylinder bore 6 consisting of several cylinder sections which are different in diameter, in which cylinder bore the control piston unit 5 reciprocates.

The booster piston 2 forms the so-called high-pressure working chamber HA in the area of its small piston section together with the cylinder bore 3, and on the other side, in the area of its large piston section, together with the cylinder bore 4, the low-pressure working chamber NA. On the one hand, the high-pressure working chamber HA is connected with the supply line V leading to the high-pressure load via a branched line. A check valve is installed in this supply line. This only lets fluid pass into the high-pressure supply line if this fluid has a certain minimum working pressure, i.e. a minimum high pressure. On the other hand, the high-pressure working chamber is connected with the low-pressure supply line P, also using an appropriate check valve. For as long as there is high pressure in the high-pressure working chamber HA, this check valve remains closed so that no high-pressure fluid can enter the low-pressure supply line. Once the pressure in the low-pressure supply line is higher than in the high-pressure working chamber HA, the high-pressure working chamber is filled with low-pressure fluid.

Here, the control piston unit 5 consists of two elements 5A and 5B. These two elements are not connected to each other, within the sense that there is no permanent firm connection between the two elements 5A and 5B. Instead, the two elements 5A and 5B even leave open a small gap between them in the positions shown in FIGS. 1 and 4 (charging and discharging position of the control piston unit) in order not to impede each other with regard to their sealing function. However, they can abut each other temporarily during the reversing movement from the charging into the discharging position and then move jointly, or force a movement upon each other.

Each of these elements forms a seat valve. Element 5A has a cone-shaped section 5.1, which together with a countersection 6.1 of the cylinder bore forms a first seat valve. Element 5B also has a cone-shaped section 5.2. Together with a matching countersection 6.2 of the cylinder bore 6, this forms a seat valve. Furthermore, the second element 5B has a further cone-shaped section 5.3, which together with a matching countersection 6.3 in the cylinder bore forms another seat valve. The countersections 6.1, 6.2 and 6.3 need not be specially processed, they may be designed to be angular or, at most, chamfered, as is shown here. They may, however, also be provided with a cone-shaped seat.

The sequence of movements of the control piston unit 5 is determined, on the one hand, by the pressure in the control line which acts on the first end face 9 of the control piston unit 5, and on the other hand, by the pressure acting on the various end face sections of the second end face of the control piston unit 5. Optionally, an appropriately dimensioned spring may also be used as a replacement for the latter pressure, because the control piston unit of the assembly according to the invention does not reach frequencies that cannot be coped with anymore using a spring. However, dispensing with a highly loaded spring has advantages, because a component is saved, which reduces costs and eliminates a potential malfunction source (springs are always in danger of being subject to fatigue by millions of load changes, that is, of suffering from fatigue failure).

The pressure booster works as follows:

FIG. 1 shows the start of a new working cycle. The booster piston is located in the area of its bottom dead center. The control piston unit is located in a position that enables filling the low-pressure working chamber. One of the two low-pressure feed lines P is sealed off by the element 5B by means of its seat valve 5.3, 6.3. The other feed line P is connected with the cylinder line C to the low-pressure working chamber via the annular chamber, which remains free between the cylinder bore and the rod-like section 7 of the element 5A. Thus, the low-pressure working chamber is charged with low pressure fluid. At the same time, the seat valve 5.1, 6.1 of the first element 5A seals off the outlet line T with respect to the low pressure area.

It should be remarked, merely for the sake of completeness, that the cylinder line C can be arbitrarily short. Its only function is to provide a low-resistance access to the low-pressure working chamber NA.

Because of this, the booster piston 2 begins to move in an upward direction, i.e., a new working cycle for generating high pressure begins.

The booster piston 2, which, if dimensioned correctly, closes off the mouth of the control line 11 very quickly, thus protecting it from high pressure admission, continues its working cycle for a fairly long time. At some point in time, it reaches the position reached by FIG. 2. In this position, the booster piston 2 has already cleared the control line 11 for a short moment. This leads to the pressure which until now had existed in the control line 11 being relieved into the intermediate space between the large and the small piston section of the booster piston 2, which is connected with the tank line, and therefore to a large extent or completely pressureless. The control piston unit 5 remains in its old position for a moment. The control piston unit 5 only starts to move when the pressure in the control line 11 is almost completely relieved. The reason is that the low pressure acting on the second end face of the element 5A at first only finds a very small surface to act on. At the moment, it cannot yet press against the entire second end face of the element 5A because the closed seat valve 5.1, 6.1 still stands in its way in this respect. The element 5A, which does not have a particularly low mass and is therefore relatively inert, now lifts off its seat. Then, the low pressure acts on the entire second end face of the element 5A. The force driving the element 5A upwardly increases suddenly. The element 5A, and thus, the entire control piston unit 5, now shoots up in an accelerated fashion into the position shown by FIG. 3.

In this position, the cone-shaped section 5.2 of the second element 5B, together with the countersection 6.2, forms a seat valve which is now closed, thus sealing off the low-pressure feed lines P with respect to the cylinder line C and the outlet line T. The cylinder line C is now connected with the outlet line T via the annular chamber, which remains free between the cylinder bore and the rod-like section 7 of the element 5A. The low-pressure working chamber now becomes pressureless, for the moment.

Because of its inertia and the correctly adjusted (not too fast) rate of travel of the control piston unit, the booster piston meanwhile just about reaches its top dead center, where the discharge of the high-pressure fluid into the supply line V ends.

Figure 4:
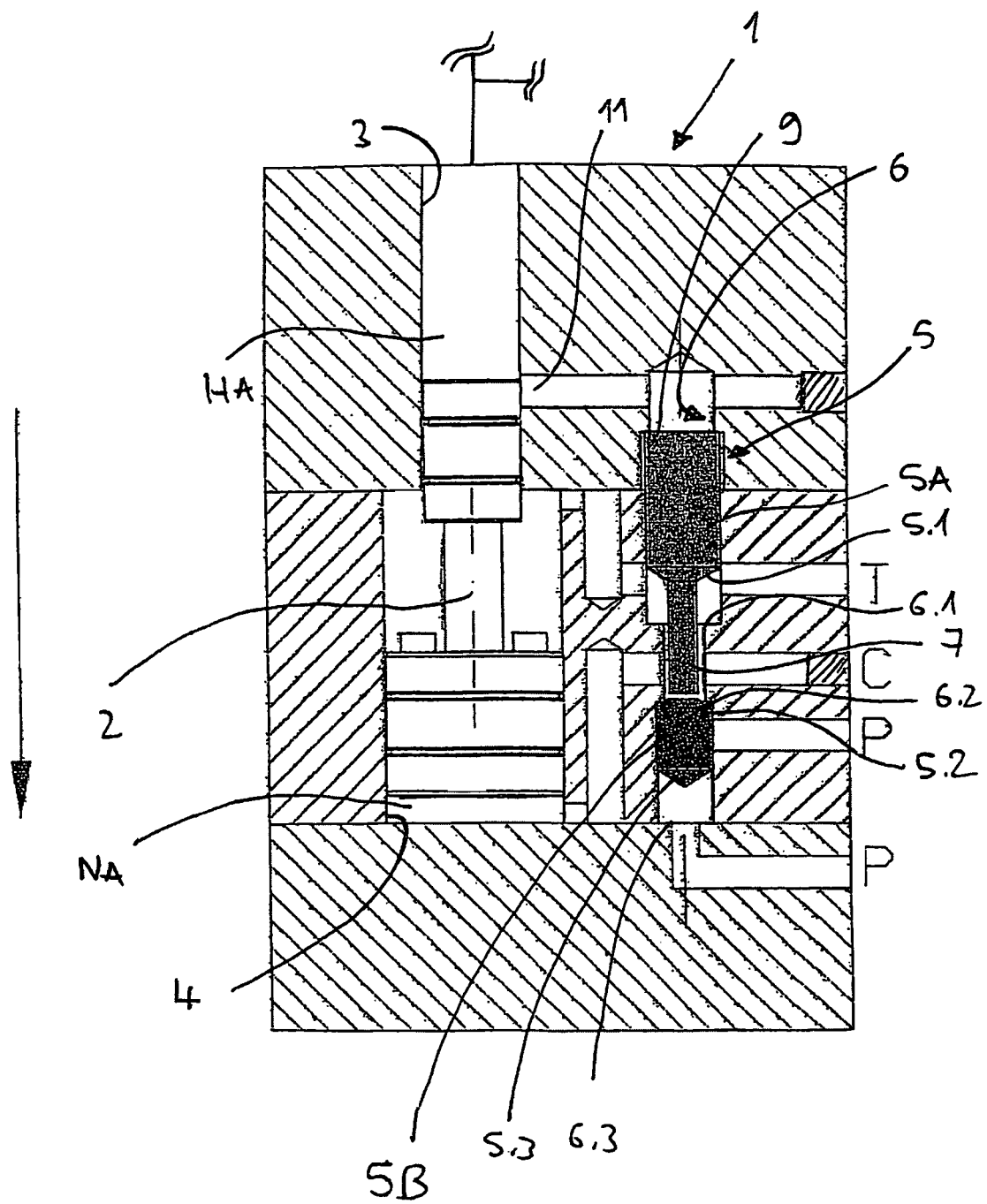
FIG. 4 shows a snapshot of the first exemplary embodiment of the pressure booster according to the invention at a point in time at which the control line is just being reconnected with the high-pressure working chamber HA, whereupon the control piston unit will reverse shortly.

Now, that flows from the low-pressure feed line P under corresponding pressure into the high-pressure working chamber HD and presses the booster piston downwardly, with the high-pressure working chamber being filled and the low-pressure working chamber being emptied. The booster piston 2 now moves downwardly more and more until it reaches the position shown by FIG. 4. At this position it begins to connect the control line 11 with the high-pressure working chamber HD. The control line 11, which until now was pressureless to a large extent, is now pressurized with the low pressure existing in the high-pressure working chamber; the reversal of the control piston unit 5, which has not yet moved at the point in time shown in FIG. 4, is now commenced. The control piston unit 5 again shoots into the position shown in FIG. 1.

Because of its inertia and the correctly adjusted (not too fast) rate of travel of the control piston unit, the booster piston 2 meanwhile just about reaches its bottom dead center, where the charging of the low-pressure working chamber HD and the discharging of the high-pressure working chamber HD end.

The cycle now starts anew.

Figure 2:
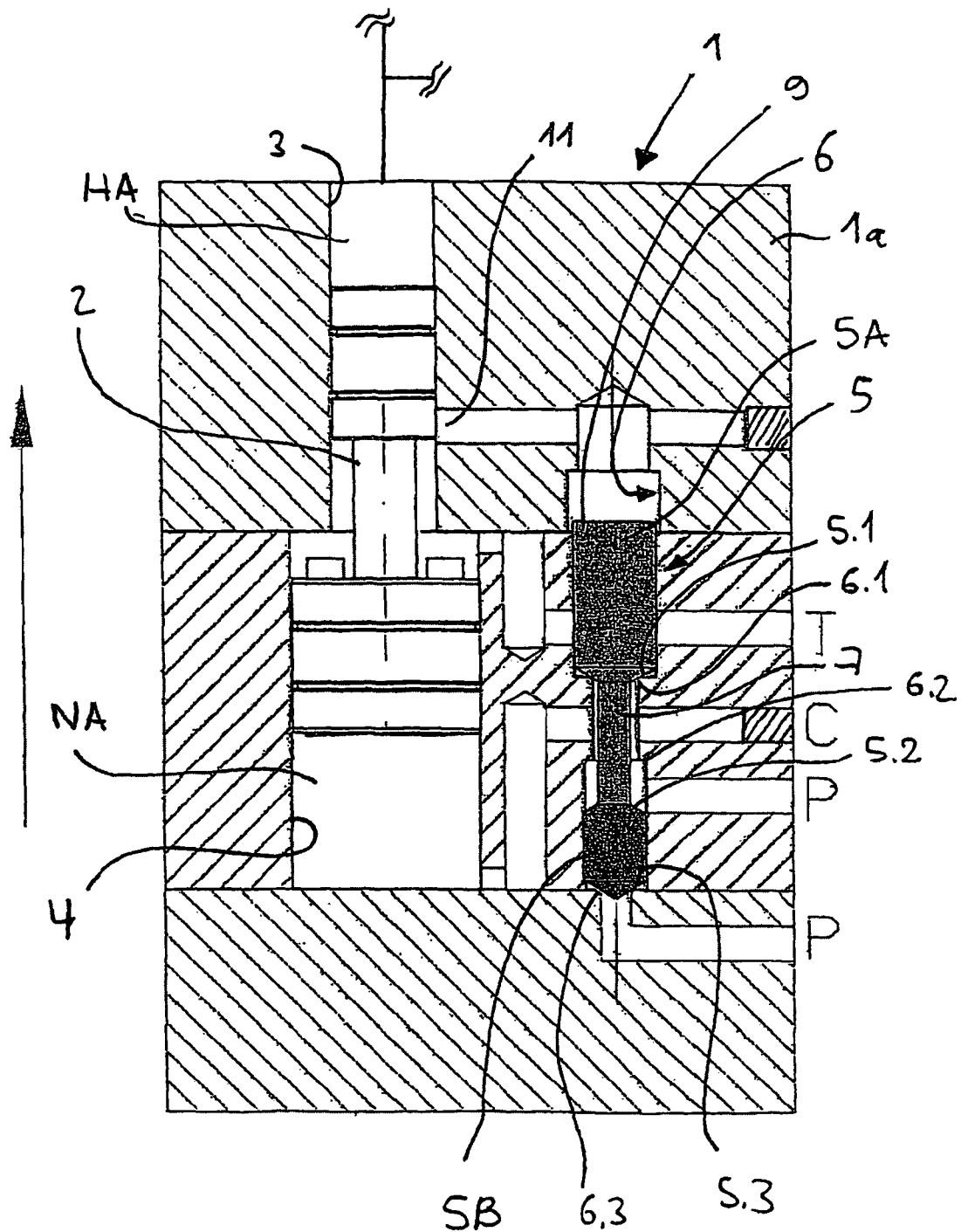
FIG. 2 shows a snapshot of the first exemplary embodiment of the pressure booster according to the invention in a position in which the control line is just being freed, which will cause the control piston unit to reverse shortly.
Figure 3:
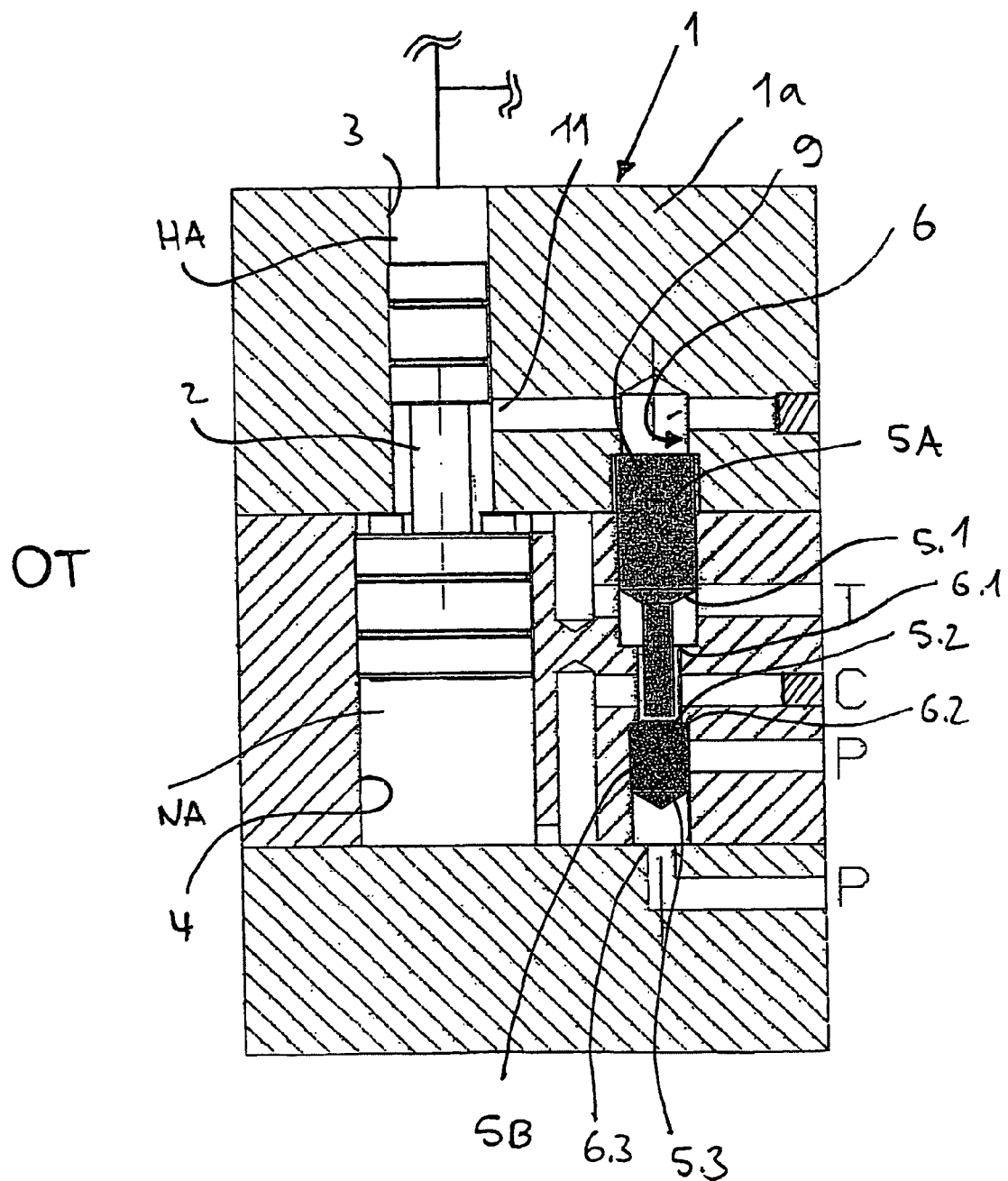
FIG. 3 shows the first exemplary embodiment of the pressure booster according to the invention at the top dead center.

It was already said above that the rate of travel of the control piston unit 5 must not be too fast. That is, the invention is based on the discovery that, if a booster piston 2 such as the one shown here is used (and given an appropriate position of the mouth of the control line relative to the booster piston), it is generally advantageous, not to shoot the control piston unit 5 with as high a frequency as possible, i.e., as "hard" as possible from its charging position to its discharging position and vice versa. It is therefore provided that the movement of the control piston unit 5 proceeds in a delayed manner as follows:

During the upward movement of the control piston unit 5 from the position shown in FIG. 2 into that shown in FIG. 3, substantially only the element 5A moves at first because the element 5B sees the same low pressure on both sides until a connection is established to the outlet line for the first time. At first, the element 5A is operated by the relatively small force of the low pressure acting on the small surface of the second end face of the element 5A, which is accessible on the other side of the valve seat. Once the element 5A has lifted off its valve seat, the low pressure finds a larger surface to act on on the element 5A. The force exerted by it increases. It does not, however, remain constant, nor does it assume maximal values, because the leakage past the piston-shaped guiding section of the element 5A towards the mouth of the outlet bore rapidly becomes larger, until the piston-shaped guiding section on the element 5A clears the mouth of the outlet bore and the pressure acting upon the element 5A and driving it in an upward direction collapses to a large extent due to the temporary hydraulic short circuit. At this moment, at the latest, or shortly before that, a significant pressure difference arises at both end faces of the element 5B, which drives the element 5B in an upward direction so that it is abutting against the element 5A, now pushing the element 5A completely upwards, even though there is no significantly driving pressure difference anymore acting on the element 5A itself. It is obvious that the amount of the force driving the entire control piston unit in an upward direction thus changes once again, and that the control piston unit is therefore not shot in an upward direction with the maximum possible force.

The downward movement of the control piston unit is also dampened; as soon as the element 5A has crossed completely the outlet bore, oil is enclosed between the element 5A and its valve seat, which can only be displaced along the annular gap between the rod-like appendage and the cylinder bore, thus temporarily building up a certain counterpressure and reducing the impact of the element 5A on its valve seat.

Finally, the rate of travel of the control piston unit 5 is also limited by the embodiment of the element 5A shown in FIG. 9, which will be explained below.

Figure 5:
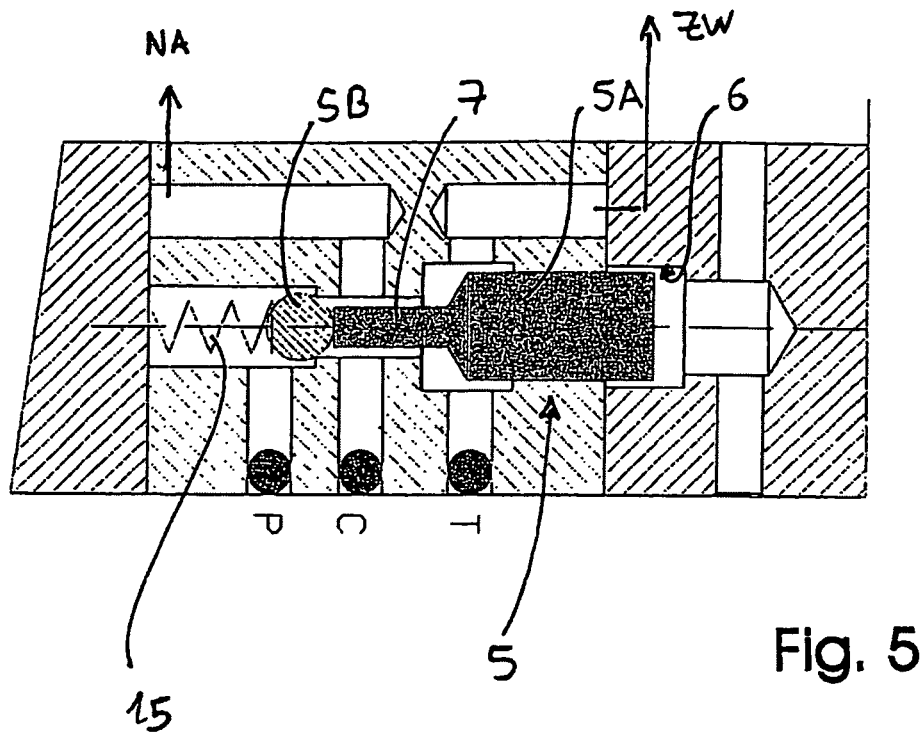
FIG. 5 shows a section from a second exemplary embodiment of the control piston unit according to the invention, which corresponds to the first exemplary embodiment apart from the design of the control piston unit.
Figure 6:
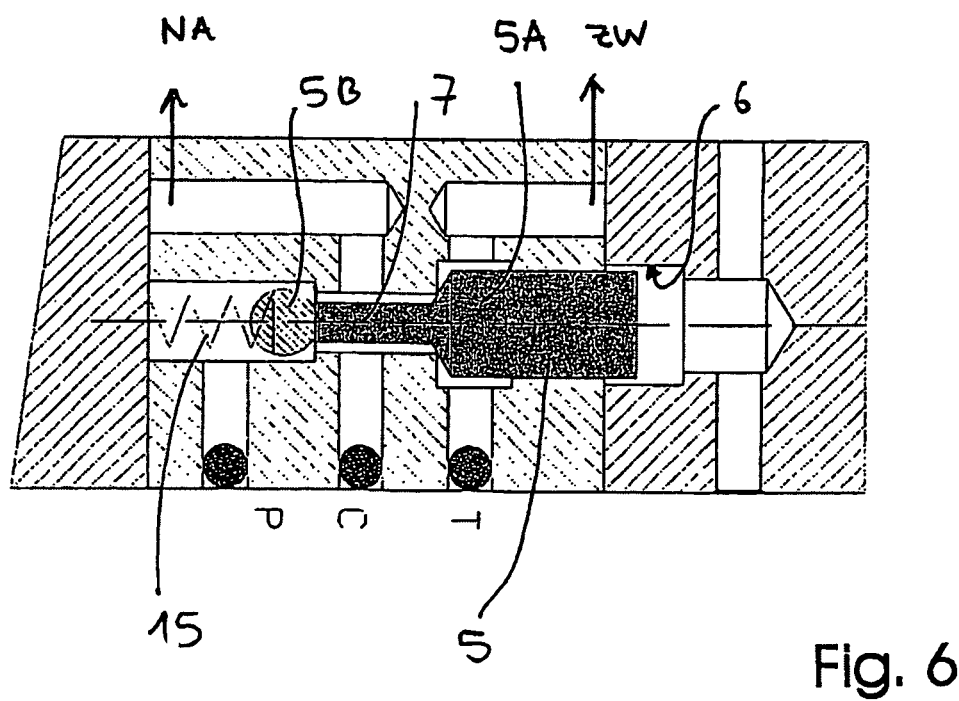
FIG. 6 shows the control piston unit of this second exemplary embodiment in another position.

FIGS. 5 and 6 show an alternative embodiment of the valve unit to be used for the pressure booster 1. The area surrounding the working piston is not shown here anymore, it is designed as shown in FIGS. 1 to 4. The arrow "NA" indicates the connection to the low-pressure working chamber NA, the arrow "ZW" indicates the connection to the intermediate space which the high-pressure section and the low-pressure section of the booster piston 2 enclose between each other. These connections are to be designed as shown in FIGS. 1 to 4 (which is not shown here).

Here, the control piston unit 5 consists of element 5A designed as above and the element 5B, which now is designed to be spherical. The first element 5A forms a seat valve in the same manner as described above with reference to the FIGS. 1 to 4. The ball element 5B in turn forms a seat valve with its spherical outer surface, together with the section 6.2 of the cylinder bore 6. Section 6.2 can be chamfered or wholly unprocessed; it is, however, preferably designed to be cone-shaped or spherical and adapted to the corresponding section 5.2 of the ball element 5B. The special feature here is that the ball element 5B travels in a cylinder bore provided with a significant oversize as soon as the ball element 5B has lifted off from its valve seat. Therefore, fluid from the low-pressure feed line P can flow around the ball element 5B towards the cylinder line C in order to charge the low-pressure working chamber NA of the working piston, without a hydraulic resistance having to be overcome that would be too large.

A ball element (which guarantees freedom from jamming) is not absolutely required in order to achieve the effect shown by FIGS. 5 and 6. The use of a piston-shaped design with a corresponding undersize with respect to the cylinder bore and a lug formed for the action of the spring is also conceivable, but not shown.

A coil spring, whose diameter is designed such that the ball element 5B has a good purchase in it, here acts as a guiding element 15. The spring guides the ball element 5B and retains it in a defined position. Not only is rattling prevented in this manner, but it is also ensured that the ball element 5B is not too distant from its seat in the position of the valve element 5 shown by FIG. 6, thus reacting accordingly quickly when the control piston unit 5 reverses.

Figure 7:
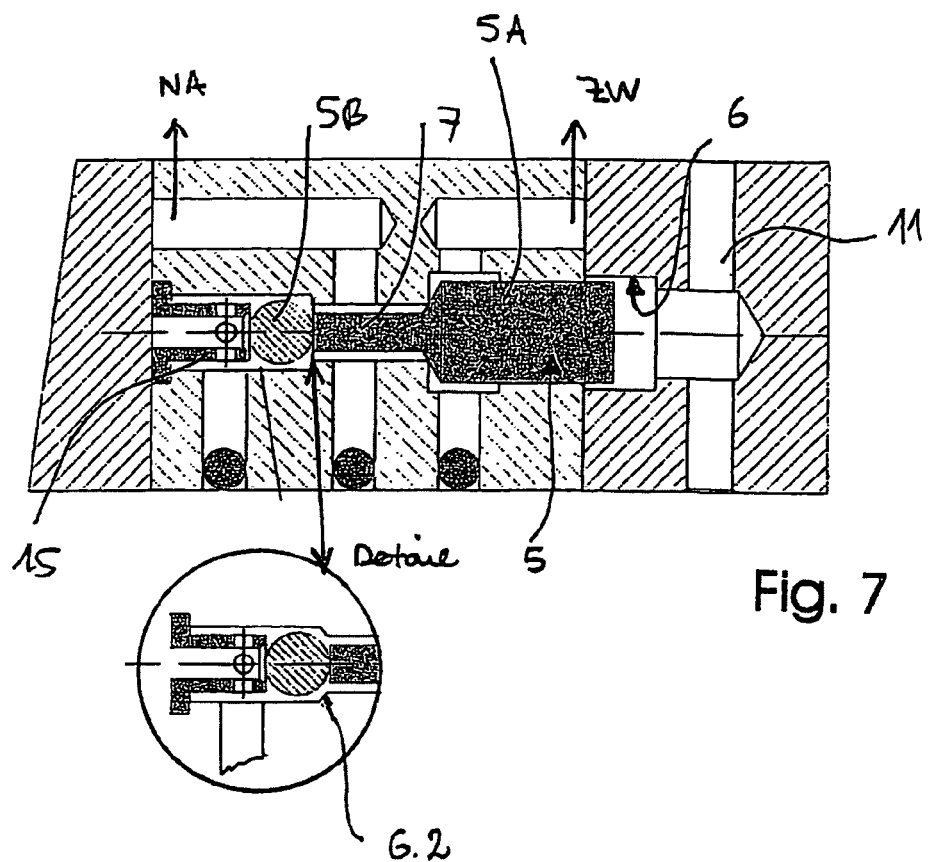
FIG. 7 shows a section from a third exemplary embodiment of the control piston unit according to the invention, which corresponds to the first exemplary embodiment apart from the design of the control piston unit.
Figure 8:
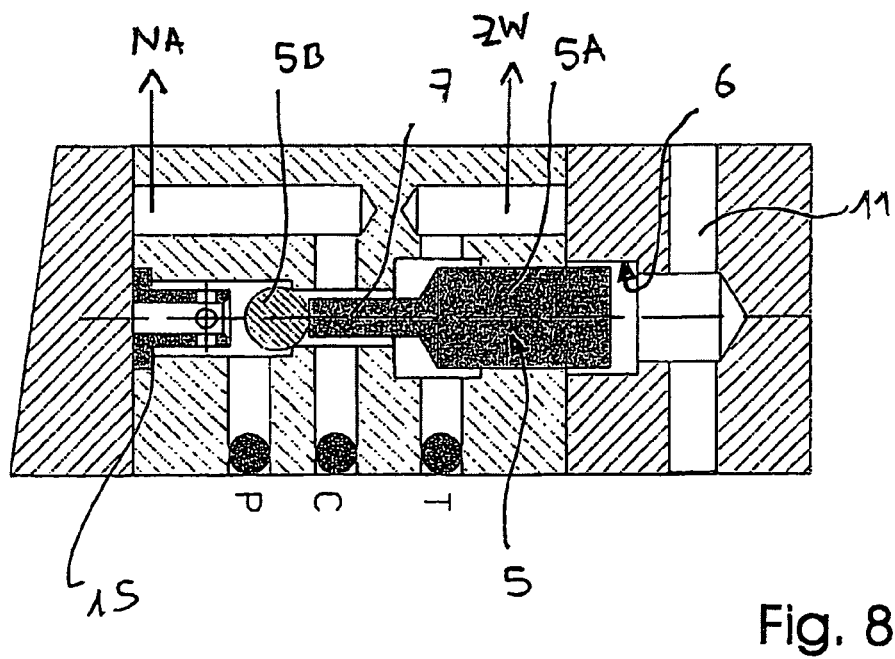
FIG. 8 shows the control piston unit of this third exemplary embodiment in another position.

FIGS. 7 and 8 show another alternative example for the control piston unit. The explanations with respect to FIGS. 5 and 6 here apply analogously.

The only difference lies in the type of the guiding element 15 used here. Here, no spring is used as a guiding element for the ball element 5B, but rather a seat sleeve. This seat sleeve ensures that the ball element 5B is retained in a defined position not too far from its valve seat when the control piston unit 5 assumes the position shown by FIG. 7. In this manner, it is ensured also in this case that the ball element 5B reacts quickly and precisely as soon as the control piston unit 5 reverses. It must also be remarked that the entire assembly is dimensioned such that a certain small clearance between the guiding element 15 and the other element 5A remains for the ball element 5B in the position shown in FIG. 7. It is thus ensured that contamination or tolerance deviation do not lead to the first element 5A possibly not quite reaching the position in which it abuts substantially tightly on its valve seat.

If a piston-shaped embodiment, as was discussed above, is employed instead of a spherical one, the explanations above apply analogously.

Figure 9:
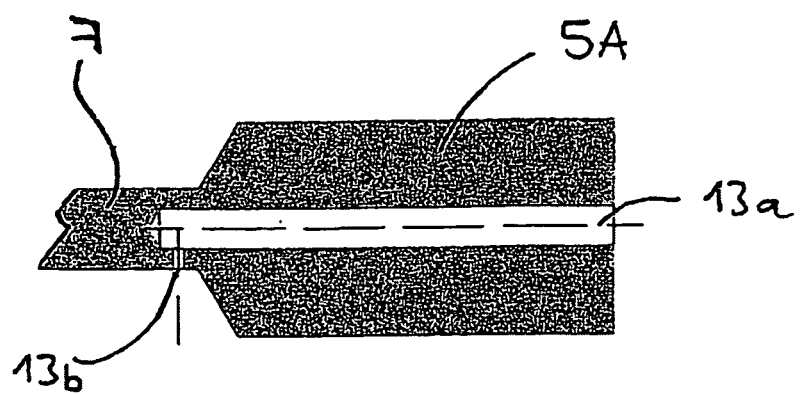
FIG. 9 shows a more exact design of an element 5A provided as a component of the control piston unit 5, which is to be used for all exemplary embodiments.

FIG. 9 shows an embodiment of the element 5A forming a component of the control piston unit. An element 5A with this design will ideally be used for all of the above described exemplary embodiments.

The element 5A is in this case provided with a blind bore 13a in an axial direction over a large area. This blind bore 13a runs from the side 9 of the element 5A, which is exposed to the pressure from the control line 11, towards the inside in an axial direction. At a suitable location, this blind bore 13a is in communication with a nozzle bore 13b with a small diameter of about 0.1 to 1.2 mm, preferably of about 0.1 to 0.8 mm. The bore diameter suitable in the specific individual case is easily determined by experiments if what is to be achieved with the nozzle bore 13b is taken into account.

This nozzle bore 13b has two kinds of effects.

When the control piston unit is located in the position shown by FIG. 1, then, as a rule, a leakage flow flows from the control line 11 into the outlet line in the assembly according to the invention. Because in the assembly according to the invention, the cylinder bore 6 is not honed anymore, but rather realized with a comparably generous fit, a transition fit, as a rule. The piston-shaped section of the element 5A therefore is not capable anymore (at least in the case of a rougher fit) to seal off the control line for the most part, unlike the corresponding piston section in the known assembly. If no countermeasures are taken, this leads to the control line losing its pressure prematurely, so that it cannot retain the control valve unit in the position shown in FIG. 1 anymore. This is unacceptable. In this case, the nozzle bore 13b provides a remedy. Because in the position of the control piston unit 5 shown in FIG. 1, it is located in an area of low pressure. Therefore, it supplies the control line 11 with low-pressure fluid, thus compensating its leakage losses.

As a rule, the nozzle bore 13b has another important task to fulfill. For as long as the element 5A does not abut its valve seat sealingly, the nozzle bore 13b is in connection with the outlet line T. It thus blows off a part of the pressure acting on its other side towards the outlet line T, in particular the pressure acting in the control line 11, during the movement of the control piston unit from its position shown in FIG. 4 into its position shown in FIG. 1. This is another measure in the canon of different measures for limiting the rate of travel of the control piston unit 5.

The invention claimed is:

1. A pressure booster for fluids having a booster piston which is embodied as a differential piston and having a control piston unit, wherein the pressure booster is configured such that a low-pressure side of the booster piston can be alternately connected by the control piston unit via a cylinder line to a low-pressure feed line and an outlet line, and a high-pressure side of the booster piston can be alternately connected to a high-pressure load line and a low-pressure feed line, and the booster piston also interacts with the control piston unit by a control line in such a way that the pressure which acts in the control line determines the position of the control piston unit and the pressure acting on various end face sections of a second end face of the control piston unit, whereby a spring is omitted from acting on any of the various end face sections of the second end face of the control piston unit, wherein:

the control piston unit comprises two reciprocating elements which are embodied as seat valves and each of which interacts with a separate valve seat and which are designed such that one of the elements intermittently seals off the low-pressure feed line, which is alternately connected to the low-pressure side of the booster piston, with respect to the cylinder line and the outlet line, and the other element intermittently seals off the outlet line, which is alternately connected to the low-pressure side of the booster piston, with respect to the cylinder line and the low-pressure feed line, such that a higher pressure acting on the seat valves is achieved resulting in a stronger pressing of the seat valves onto their corresponding valve seats; wherein one of the elements is formed as a piston and has a rod-like section for acting on the other element, which rod actuates the other element in order for the outlet line and the low-pressure feed line to communicate with the cylinder line, via an annular chamber, wherein the annular chamber is located between corresponding cylinder bores in which the two elements reciprocate and the external surface of the rod-like element and remains free of engagement with the piston-rod.

2. The pressure booster according to claim 1, wherein the elements are not rigidly connected with each other.

3. The pressure booster according to claim 1, wherein the other one of the elements is also formed as a piston.

4. The pressure booster according to claim 1, wherein the other one of the elements is spherical or a full sphere.

5. The pressure booster according to claim 1, wherein the element that intermittently seals the low-pressure feed line which is connectable with the low-pressure side of the booster piston with respect to the cylinder line and the outlet line, is located between a low-pressure line and the cylinder line when the low-pressure working chamber inside of which the low-pressure side of the booster piston is reciprocating is filled with fluid and is arranged in the cylinder associated with it in such a way the fluid can flow from the low-pressure feed line past said element into the cylinder line to the low-pressure working chamber in order to fill the low-pressure working chamber.

6. The pressure booster according to claim 5, wherein fluid can flow from the low-pressure feed line exclusively or substantially exclusively past the element that intermittently seals the low-pressure feed line into the cylinder line to the low-pressure working chamber in order to fill the low-pressure working chamber.

7. The pressure booster according to claim 5, wherein, apart from the cylinder accommodating the other element, an additional guiding element for at least a partial guidance or position control of the other element is provided.

8. The pressure booster according to claim 7, wherein the additional guiding element is a spring.

9. The pressure booster according to claim 7, wherein the additional guiding element is a seat element which centers the other element in the cylinder bore when it comes into contact with the seat element.

10. The pressure booster according to claim 1, wherein the element that intermittently seals the outlet line connectable with the low-pressure working chamber of the booster piston with respect to the low-pressure feed line and the cylinder line, is provided with a bore, one end of which opens into the control line and another end of which, depending on the position of the control piston unit, is intermittently connected with an area under low pressure via a throttle or nozzle bore, and intermittently connected with a largely pressureless area.

11. The pressure booster according to claim 1, wherein the area of a control cylinder bore accommodating the control piston unit comprises three sections of different diameters, wherein the section with the smallest diameter is disposed between the two other sections.

12. The pressure booster according to claim 11, wherein the area of the control cylinder bore interacting with the control piston unit comprises additional two or three sections having different diameters.

13. The pressure booster according to claim 1, wherein the pressure booster, on one of the elements of the control piston unit, has a third section formed as a seat valve and interacting with another valve seat, wherein the third section sealingly abuts its seat when the control piston unit is located in its final position connecting the low-pressure feed line with the cylinder line.

14. The pressure booster according to claim 1, wherein the pressure booster has a plurality of the control piston units, which connect the low-pressure side of a single joint booster piston via cylinder lines alternately with at least one low-pressure feed line and at least one outlet line.

* * * * *